(12) United States Patent
Kim et al.

(10) Patent No.: US 6,758,384 B2
(45) Date of Patent: Jul. 6, 2004

(54) THREE-DIMENSIONAL SOLDERING INSPECTION APPARATUS AND METHOD

(75) Inventors: Chang-Hyo Kim, Yongin (KR); Tae-Sun Choi, Kwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/137,388

(22) Filed: May 3, 2002

(65) Prior Publication Data

US 2002/0179679 A1 Dec. 5, 2002

(30) Foreign Application Priority Data

May 3, 2001 (KR) ........................................ 2001-24129

(51) Int. Cl.[7] .............................................. B23K 31/02
(52) U.S. Cl. ............................. 228/102; 8/103; 8/104; 8/105
(58) Field of Search ................................ 228/102, 103, 228/104, 105, 8, 9, 10

(56) References Cited

U.S. PATENT DOCUMENTS

| | | | | |
|---|---|---|---|---|
| 5,064,291 A | * | 11/1991 | Reiser | 356/625 |
| 5,298,989 A | * | 3/1994 | Tsukahara et al. | 348/126 |
| 5,836,504 A | * | 11/1998 | Koike et al. | |
| 6,134,013 A | * | 10/2000 | Sirat et al. | 356/602 |
| 6,177,682 B1 | * | 1/2001 | Bartulovic et al. | 250/559.44 |
| 6,201,892 B1 | * | 3/2001 | Ludlow et al. | 382/149 |
| 6,236,747 B1 | * | 5/2001 | King et al. | 382/149 |
| 6,340,109 B2 | * | 1/2002 | Hashimoto et al. | 228/103 |
| 6,445,814 B2 | * | 9/2002 | Iijima et al. | 382/154 |
| 6,559,931 B2 | * | 5/2003 | Kawamura et al. | 356/4.01 |
| 2001/0012107 A1 | * | 8/2001 | Toh | |
| 2001/0021026 A1 | * | 9/2001 | Liu | |

FOREIGN PATENT DOCUMENTS

| | | | |
|---|---|---|---|
| JP | 402071109 A | * | 3/1990 |
| JP | 402083403 A | * | 3/1990 |

* cited by examiner

*Primary Examiner*—Kiley Stoner
(74) *Attorney, Agent, or Firm*—Staas & Halsey LLP

(57) ABSTRACT

A three-dimensional soldering inspection apparatus and method. The three-dimensional soldering inspection apparatus includes a lighting module provided with a plurality of light emitting devices, a photographing unit installed at a portion of the lighting module to photograph a subject placed inside the lighting module, an image processing unit to capture each frame image from an image photographed by the photographing unit, a storage unit to store data of each frame image, a control unit to extract three-dimensional features from each frame image and restore the extracted features as a three-dimensional image, and a display unit to display the three-dimensional image under the control of the control unit.

18 Claims, 14 Drawing Sheets

THREE-DIMENSIONAL SOLDERING INSPECTION APPARATUS AND METHOD

CROSS-REFERENCE TO RELATED APPLICATIONS

This application claims the benefit of Korean Patent Application No. 2001-24129 filed on May 3, 2001, in the Korean Industrial Property Office, the disclosure of which is incorporated herein by reference.

BACKGROUND OF THE INVENTION

1. Field of the Invention

The present invention relates generally to a soldering inspection apparatus and method, and more particularly to a three-dimensional soldering inspection apparatus and method, which restores a soldered surface three-dimensionally to confirm whether a defective soldering occurs.

2. Description of the Related Art

In general, processes to manufacture electric and electronic boards include a process of inspecting a soldered state of each part after mounting the part to a board and executing a reflow process.

In conventional methods of inspecting the soldered states, inspection is performed in such a way that an inspector inspects the soldered states of parts with his naked eyes. Therefore, the qualities of products using the soldering process are not uniform, depending on conditions and skill of the inspectors. Further, the conventional methods are problematic in that the productivity of products is remarkably low due to their long inspection times when complicated printed circuit boards are inspected.

SUMMARY OF THE INVENTION

Accordingly, it is an object of the present invention to provide a three-dimensional soldering inspection apparatus and method, which restores a soldered state three-dimensionally, such that an inspector can easily inspect soldered states of boards, thus increasing the productivity and quality of products employing the boards.

Additional objects and advantages of the invention will be set forth in part in the description which follows and, in part, will be obvious from the description, or may be learned by practice of the invention.

The foregoing and other objects of the present invention are achieved by providing a three-dimensional soldering inspection apparatus, comprising: a lighting module provided with a plurality of light emitting devices; a photographing unit installed at a portion of the lighting module to photograph a subject placed inside the lighting module; an image processing unit to capture each frame image from the subject photographed by the photographing unit; a storage unit to store data of each frame image; a control unit to extract three-dimensional features from each frame image and restore the extracted features as a three-dimensional image; and a display unit to display the three-dimensional image under the control of the control unit.

The foregoing and other objects of the present invention are also achieved by providing a method of controlling a three-dimensional soldering inspection apparatus, comprising: obtaining frame images by turning on light emitting devices in a direction of a subject, photographing said light emitted from said light emitting devices and reflected off of the subject, dividing and computing each obtained frame image, extracting three-dimensional features from each divided and computed frame image, and restoring the extracted three-dimensional features as a three-dimensional image.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
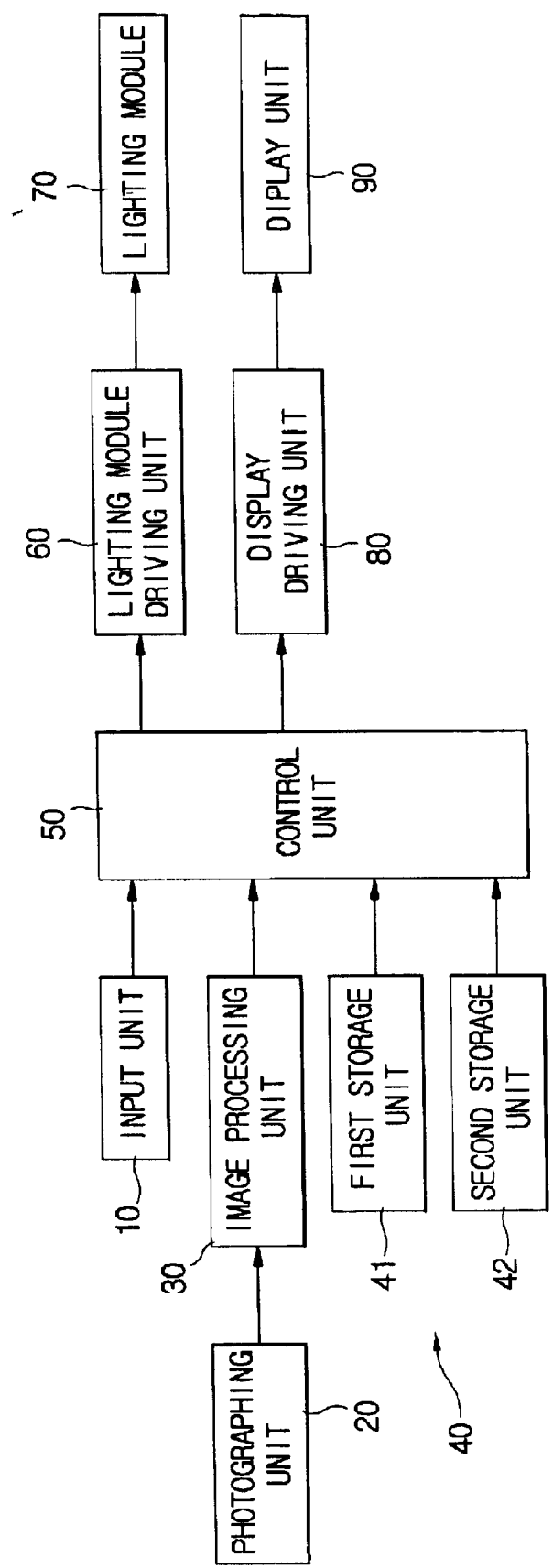
FIG. 1 is a block diagram of a three-dimensional soldering inspection apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a three-dimensional soldering inspection apparatus according to an embodiment of the present invention.

Referring to FIG. 1, the three-dimensional soldering inspection apparatus comprises an input unit 10, a lighting module 70, a lighting module driving unit 60, a photographing unit 20, an image processing unit 30, a control unit 50, a display unit 90 and a display driving unit 80. The input unit 10 inputs data including operation commands. The lighting module 70 has a plurality of light emitting devices (e.g., light emitting diode, LED) attached thereto. The lighting module driving unit 60 drives the lighting module 70. The photographing unit 20 is installed at a portion of the lighting module 70, functions to photograph a subject, and can be implemented as a charge coupled device (CCD) camera. The image processing unit 30 captures frame images from a subject photographed by the photographing unit 20 and processes the frame images in a predefined way. The control unit 50 extracts three-dimensional features of the subject from the frame images and restores the three-dimensional features as a three-dimensional image. The display unit 90 displays the three-dimensional image. The display driving unit 80 drives the display unit 90.

The soldering inspection apparatus of this invention further comprises a storage unit 40 to store data. The storage unit 40 is comprised of a first storage unit 41 to store programs related to the overall operation of the apparatus and a second storage unit 42 to store data related to an image processing.

Figure 2:
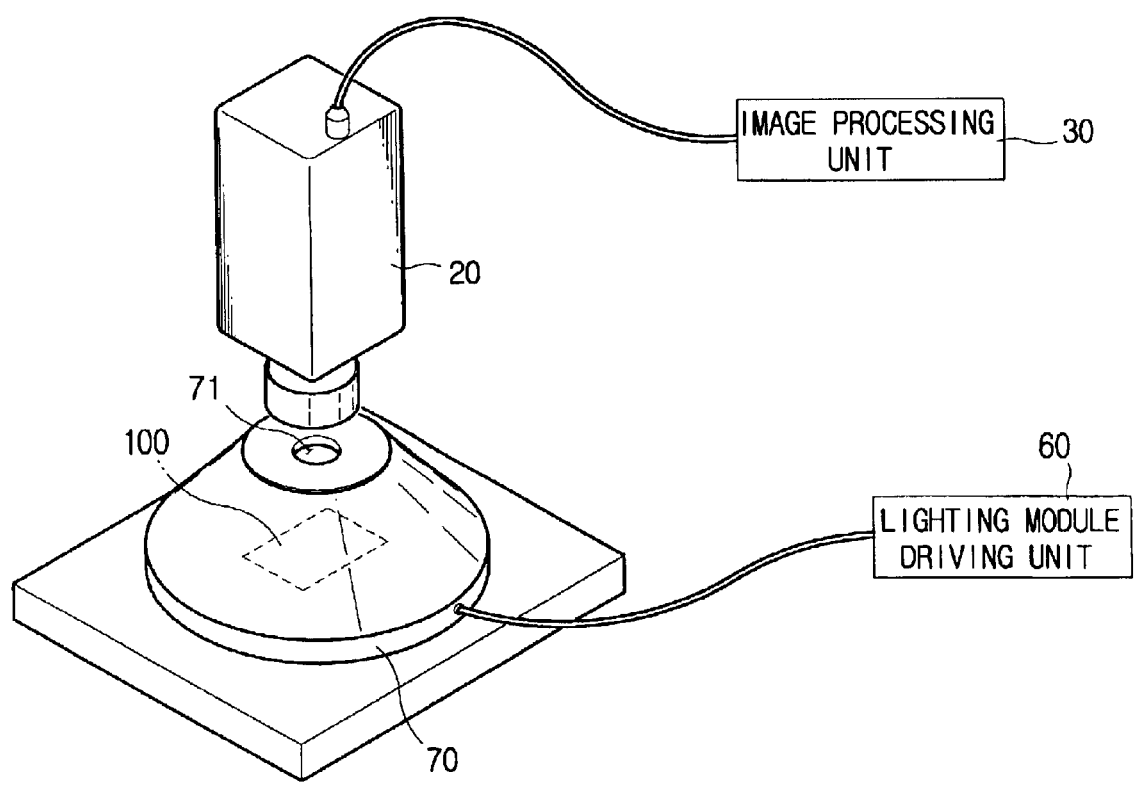
FIG. 2 is a perspective view illustrating the three-dimensional soldering inspection apparatus of this invention.

FIG. 2 is a perspective view illustrating the three-dimensional soldering inspection apparatus of this invention.

Referring to FIG. 2, the lighting module 70 connected to the lighting module driving unit 60 covers a subject 100, and the photographing unit 20 is connected to the image processing unit 30. The photographing unit 20 connected to the image processing unit 30 is installed at a photographing hole 71 in the top of the lighting module 70 such that the photographing unit 20 can photograph the subject 100. In an embodiment of this invention, the area of the subject 100 is set to 3 cm×3 cm. However, the area of the subject 100 can be changed depending on the size of a soldered portion.

Figure 3:
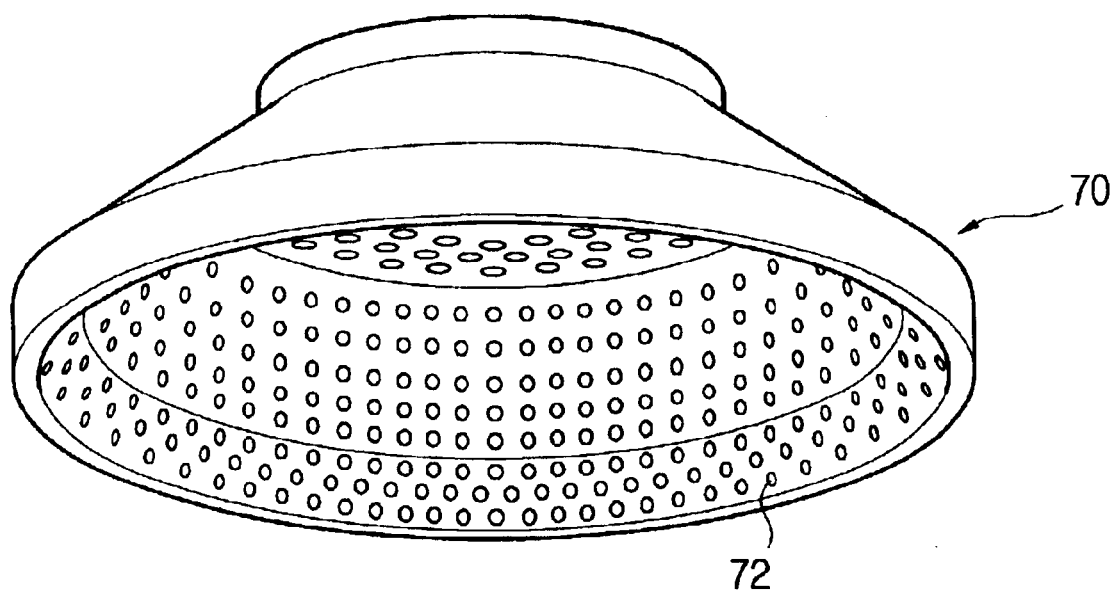
FIG. 3 is a perspective view illustrating the lighting module of the three-dimensional soldering inspection apparatus of this invention.

FIG. 3 is a perspective view illustrating the lighting module of the three-dimensional soldering inspection apparatus of this invention.

Referring to FIG. 3, the lighting module 70 has a hemisphere or dome shape whose bottom is opened. It is to be noted that other shapes may be provided which achieved the desired objects of the invention. On the inner surface of the lighting module 70, a plurality of light emitting devices 72 are installed in stages and uniformly arranged in the form of rings. In this case, there is no need to equally space the light emitting devices 72. Further, the light emitting devices 72 can be grouped into one or more units to be driven in the form of point light sources under the control of the lighting module driving unit 60 controlled by the control unit 50. Additionally, the light emitting devices 72 can be operated to be on/off, and also variably operated within a range from a minimum illuminance to a maximum illuminance.

Hereinafter, the operation of the three-dimensional soldering inspection apparatus of the present is described in detail.

The present invention employs the light emitting devices 72 arranged in the form of point light sources so as to determine all possible incident angles on a subject, that is, an object to be inspected, from the photographing unit 20 installed at the top of the lighting module 70.

Figure 4A:
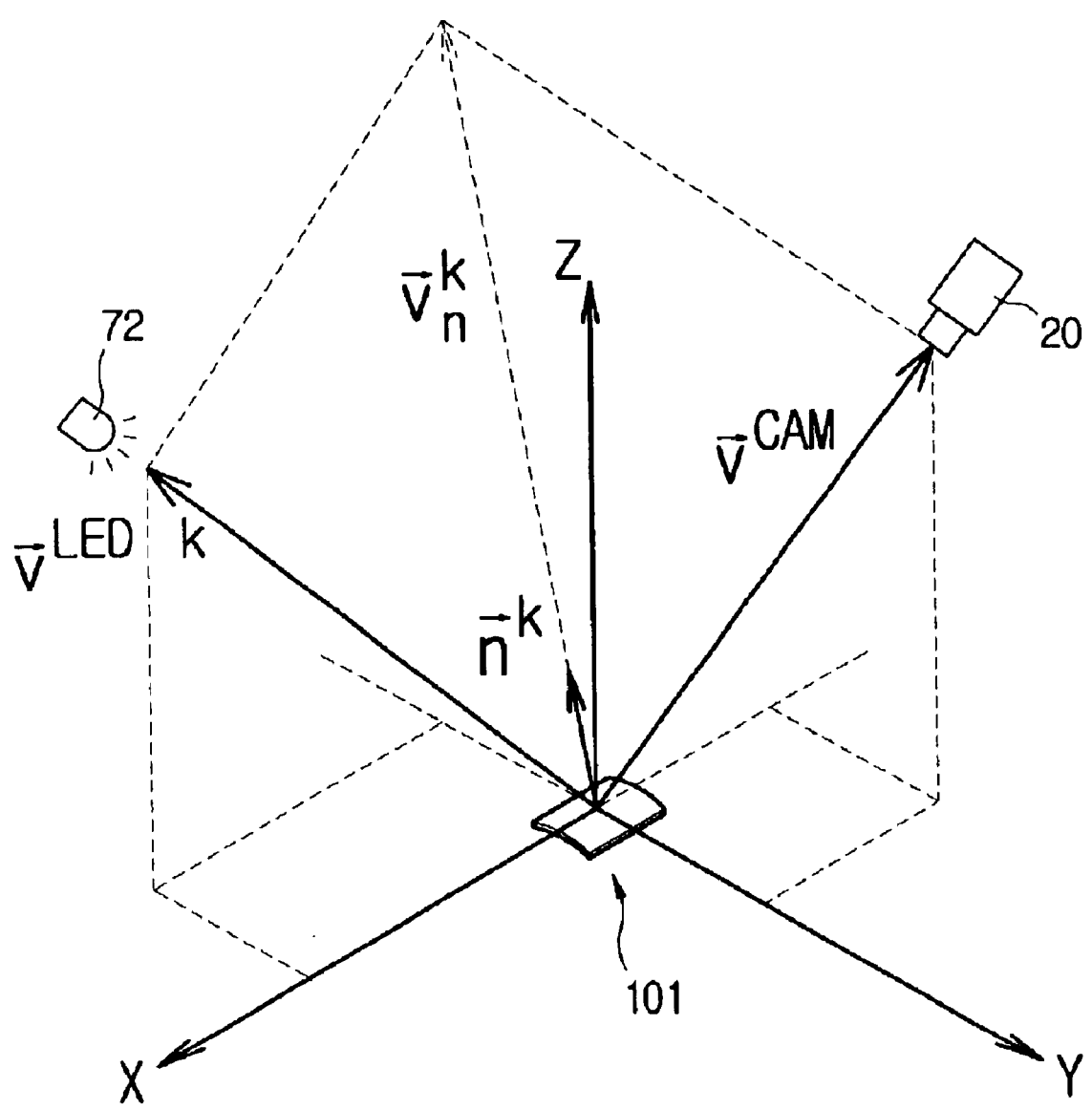
FIGS. 4A and 4B are views illustrating the operation of the three-dimensional soldering inspection apparatus of this invention.

FIG. 4A is a view illustrating the operation of the three-dimensional soldering inspection apparatus of the present invention.

Referring to FIG. 4A, in the case where light emitted from one light emitting device 72, that is, a light source, is reflected by the soldered surface 101 and inputted to the photographing unit 20 when the soldered surface 101 by which the light is reflected is set to an origin, a vector of the light source from the origin is $\vec{v}^{LED\_k}$, is as shown in FIG. 4A. At this time, a vector of light incident on the photographing unit 20 (hereinafter, referred to as "photographing unit vector") is $\vec{v}^{CAM}$. In this case, the sum of the light source vector $\vec{v}^{LED\_k}$ and the photographing unit vector $\vec{v}^{CAM}$ is $\vec{v}_n^k$, and is the normal vector of the soldered surface 101. Further, the unit vector of the normal vector is $\vec{n}^k$. In other words, the sum $\vec{v}_n^k$ of the light source vector $\vec{v}^{LED\_k}$ and the photographing unit vector $\vec{v}^{CAM}$ to the soldered surface 101 is the normal vector to the soldered surface 101.

Therefore, if $W_{i,j}^k$ is set to a k-th brightness value on a plane of Z=0, a normal vector to a point P(i,j) on the k-th image (or a soldered surface corresponding to the k-th image) is defined as the following Equation {1}.

$$\vec{n}_{i,j}^k = \frac{\vec{v}_{i,j}^{LED\_k} + \vec{v}_{i,j}^{CAM}}{\left\|\vec{v}_{LED}^k + \vec{v}_{i,j}^{CAM}\right\|} W_{ij}^k, \; W_{ij}^k = f(I_{i,j}^k) \quad \{1\}$$

where, $\vec{n}_{i,j}^k$ is the normal vector to a point P(i,j) calculated by analyzing the k-th image, $\vec{v}_{i,j}^{LED\_k}$ is a position vector from the point P(i,j) on the image to be analyzed (or solder surface) to a k-th LED, and $\vec{v}_{i,j}^{CAM}$ is a position vector from the projected point P(i,j) on the soldered surface to the photographing unit 20.

Figure 4B:
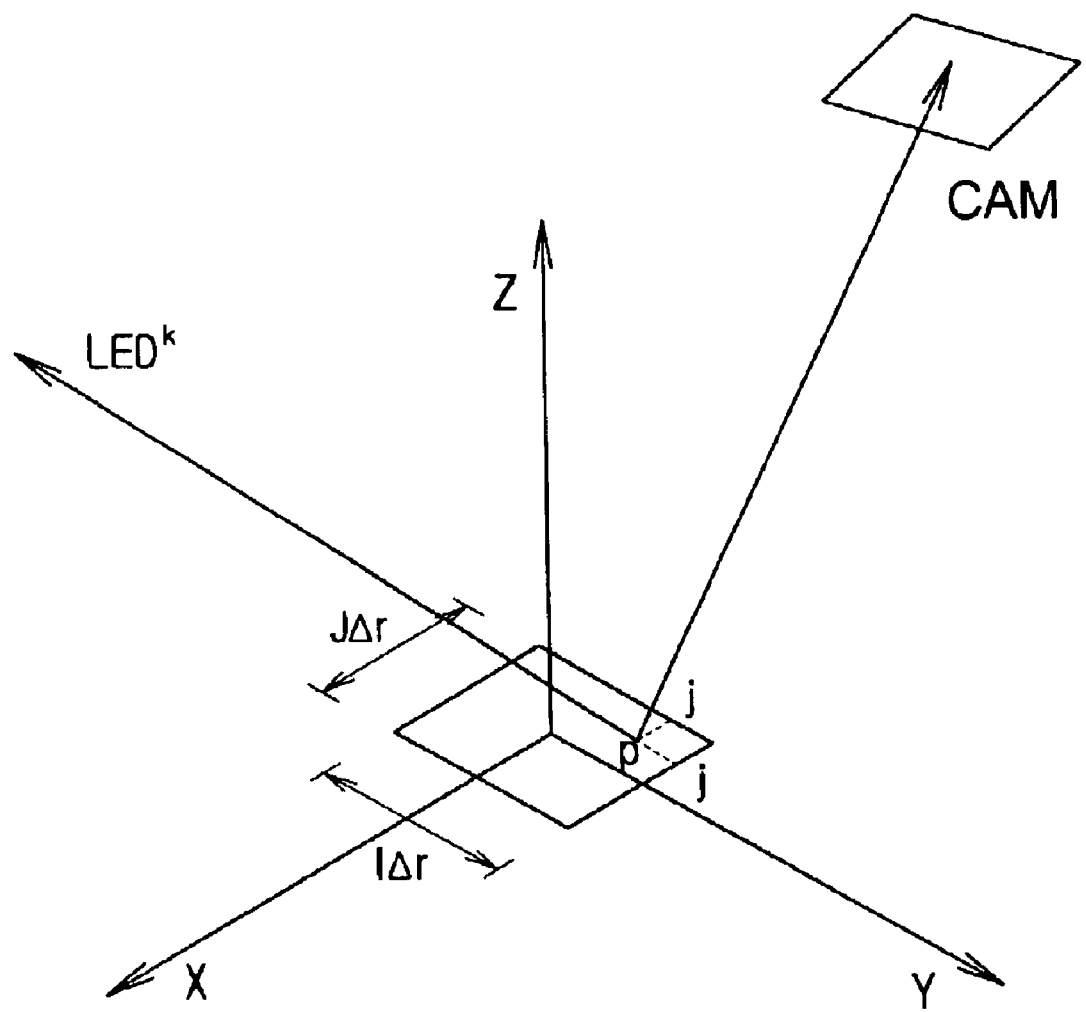

FIG. 4B is a view illustrating the operation of the three-dimensional soldering inspection apparatus of this invention.

Referring to FIG. 4B, if $Z^{CAM} >> I\Delta r$ and $\|\vec{v}_{i,j}^{LED\_k}\| >> I\Delta r$, $\vec{v}_{i,j}^{CAM} = \vec{v}^{CAM}$ and $\vec{v}_{i,j}^{LED\_k} = \vec{v}^{LED\_k}$ can be constructed. Further, a weighting element $W_{i,j}^k$ is a function of the brightness value of the image, and is defined as $W_{i,j}^k = f(\vec{v}_{i,j}^k)$.

In this case, a vector field expressed as the following Equation {2} is calculated using the total k images.

$$\vec{N}^{i,j} = \frac{\sum_{k=0}^{K} \vec{n}_k^{i,j}}{\left\|\sum_{k=0}^{K} \vec{n}_k^{i,j}\right\|} \quad \{2\}$$

After the vector field is calculated, a solder shape $Z_{i,j}^{SOL}$ is calculated from the vector field.

A function to decide the height of the soldered surface is defined as the following Equation {3}.

$$Z_{i,j}^{SOL} - Z_{i-1,j}^{SOL} = \frac{\partial Z_{i,j}^{SOL}}{\partial x} = (\vec{N}_{i,j})_x \quad \{3\}$$

$$Z_{i,j}^{SOL} - Z_{i,j-1}^{SOL} = \frac{\partial Z_{i,j}^{SOL}}{\partial y} = (\vec{N}_{i,j})_y$$

The above Equation {3} can be modified to the following Equation {4}.

$$Z_{i,j}^{SOL} = Z_{i-1,j}^{SOL} + (\vec{N}_{i,j})_x \quad \{4\}$$

$$Z_{i,j}^{SOL} = Z_{i,j-1}^{SOL} + (\vec{N}_{i,j})_y$$

Hereinafter, a method of controlling the soldering inspection apparatus of this invention is described in detail.

Figure 5:
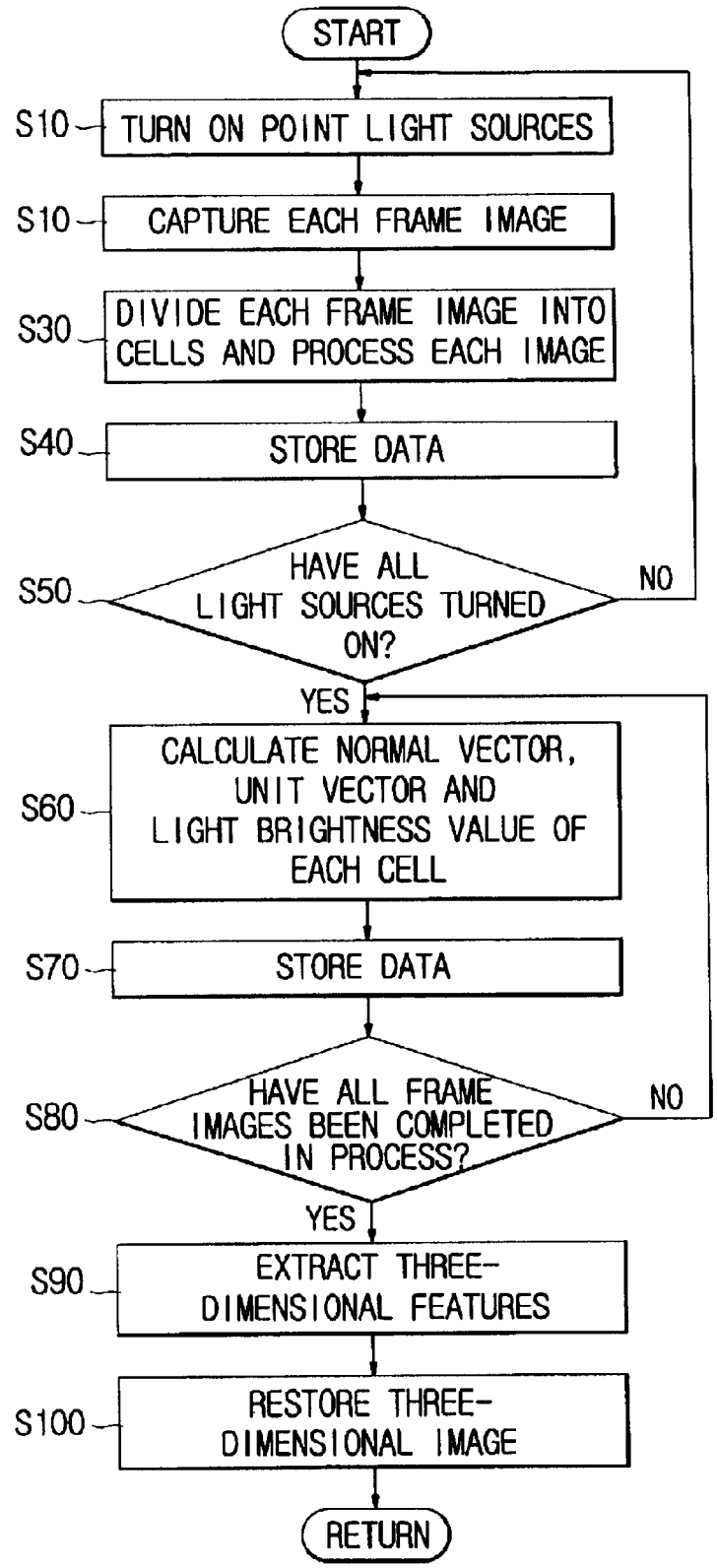
FIG. 5 is a flowchart of a method of controlling the three-dimensional soldering inspection apparatus of this invention.

FIG. 5 is a flowchart of a three-dimensional inspection apparatus controlling method.

Figure 6A:
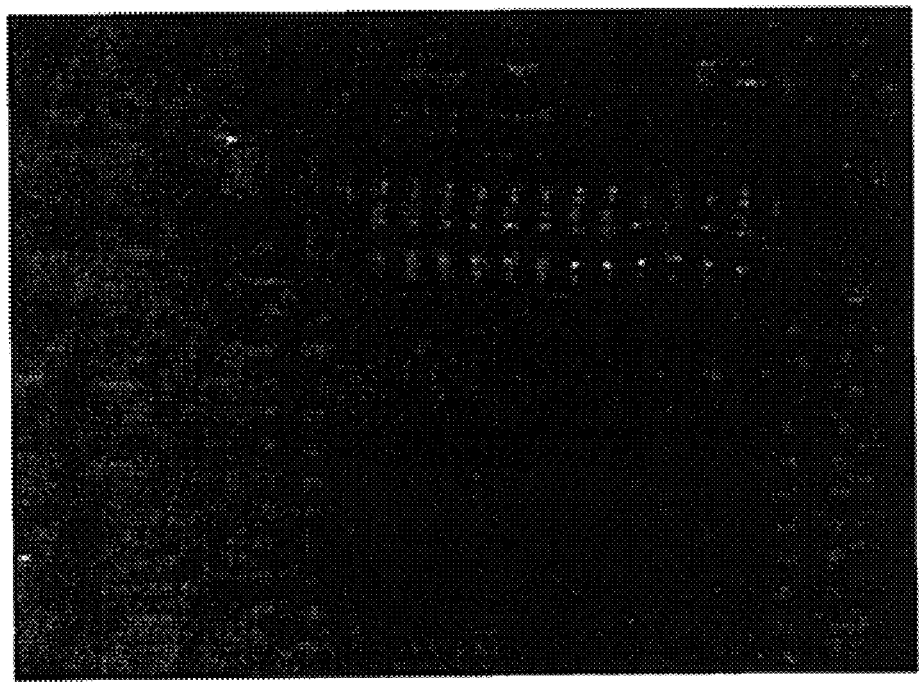
FIGS. 6A to 6C are views illustrating an operational example of the three-dimensional soldering inspection apparatus of this invention.
Figure 6B:
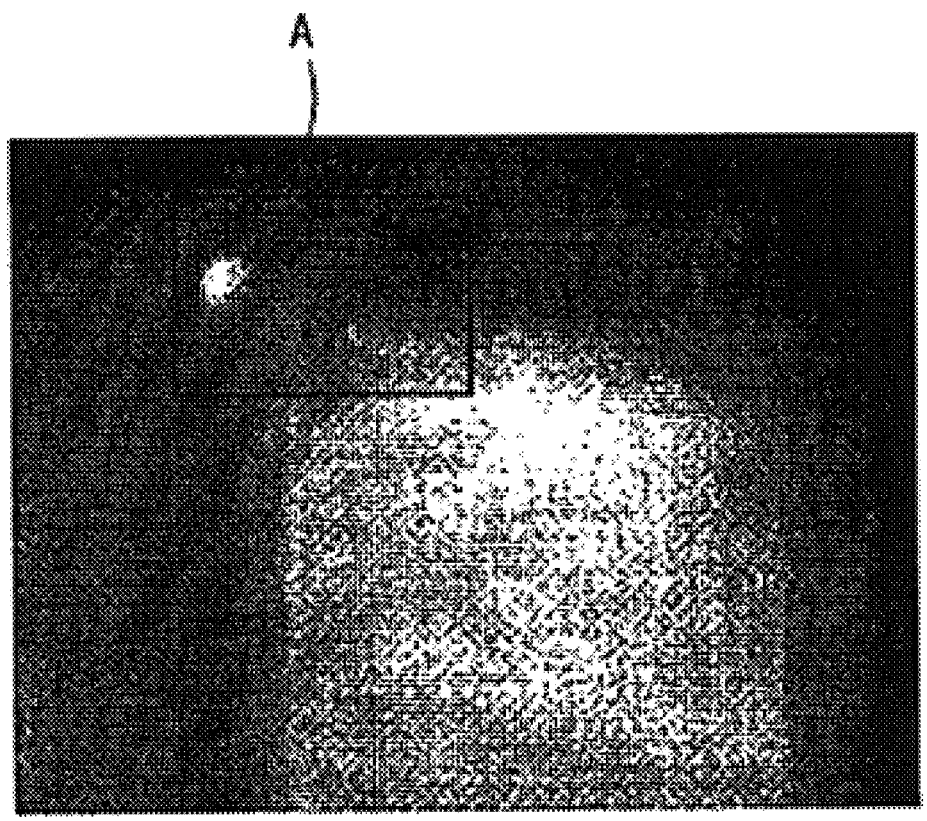
Figure 6C:
Figure 7A:
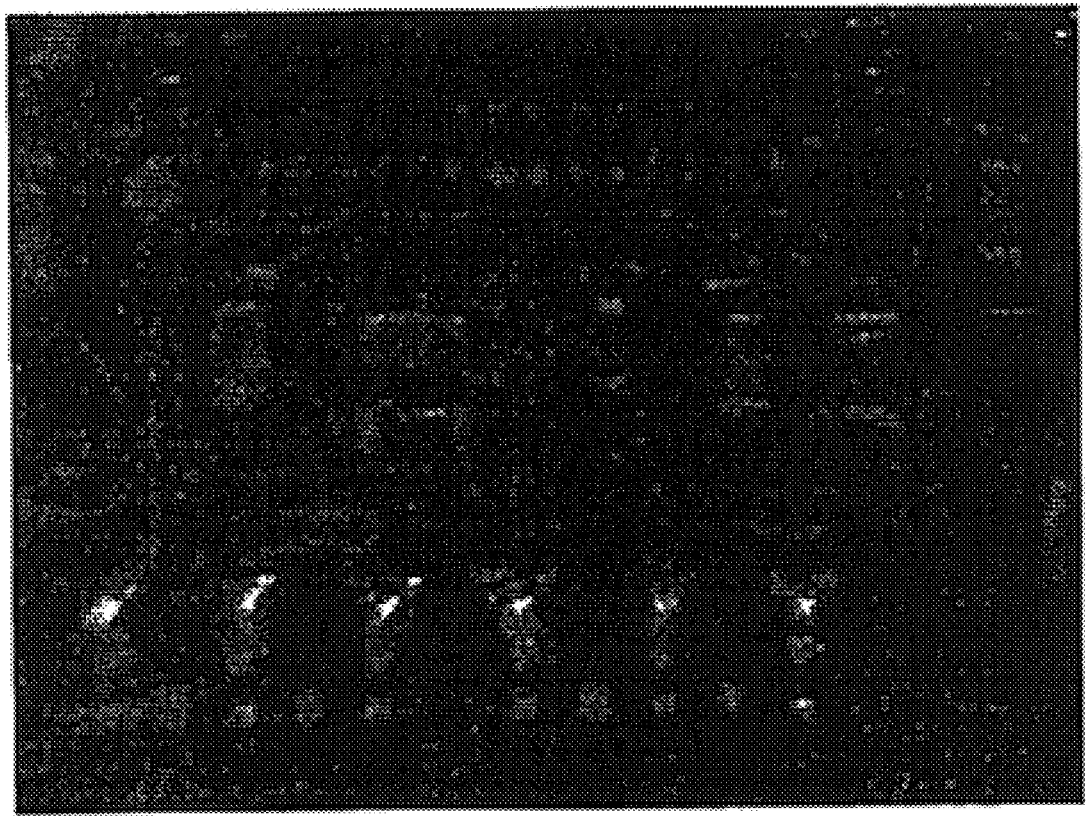
FIGS. 7A to 7C are views illustrating another operational example of the three-dimensional soldering inspection apparatus of this invention.
Figure 7B:
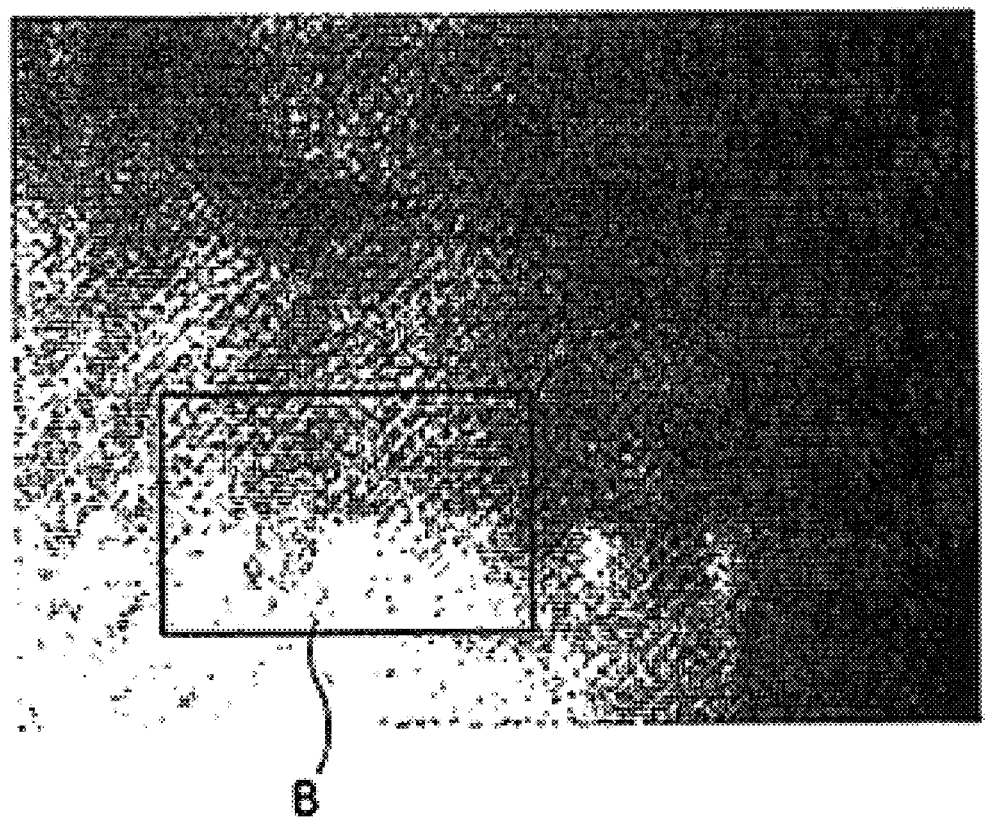
Figure 7C:

The control unit 50 controls the light module driving unit 60 to operate the light emitting devices 72 as the point light sources at operation S10. In this case, the light emitting devices 72 can be driven as the point light sources by being grouped into one or more units. When the light emitting devices 72 are turned on, the image processing unit 30 captures or grabs each frame image from the subject photographed by the photographing unit 20 at operation S20. The captured frame images are shown in FIGS. 6A and 7A.

The image processing unit 30 divides the frame image into a plurality of cells (that is, matrices each with a size of (i×j)), and calculates a light brightness value per cell so as to process the images. The frame image process is shown in FIGS. 6B and 6C and FIGS. 7B and 7C.

Further, the image processing unit 30 transmits the processed image data to the control unit 50 at operation S30. The control unit 50 stores the data outputted from the image processing unit 30 in the second storage unit 42 at operation S40. Here, the cell of (i×j) is obtained by modifying the point P(i,j) into an area.

The control unit 50 determines whether all of the light emitting devices 72, that is, point light sources, have been turned on at operation S50. At this time, if there are any light emitting devices 72 not turned on, operations S10 to S50 are repeatedly performed.

Therefore, if the above operations are executed with respect to all the light emitting devices 72 of the lighting module 70, frame images of the same number as the light emitting devices (that is, point light sources) turned on can be obtained. In this case, all the data of the frame images are stored in the second storage unit 42.

If it is determined that all the point light sources have been turned on at operation S50, the control unit 50 calculates each unit vector $\vec{n}_{i,j}^{1}$, that is, $\vec{n}_{1,1}^{1}, \vec{n}_{1,2}^{1}, \vec{n}_{1,3}^{1} \ldots \vec{n}_{i,j}^{1}$ from each cell (i,j) of a frame image to a first point light source (here, k=1), which is stored in the second storage unit 42, and each brightness value of each cell using the above Equation {1} at operation S60. The calculated unit vectors and brightness values are stored in the second storage unit 42 at operation S70. The unit vector of each cell is a unit vector of the sum of the predefined point light source vector and the photographing unit vector, as described above.

The control unit 50 determines whether the data processing of all the frame images has been completed at operation S80. If it is determined that the data processing of all the frame images is not completed at operation S80, the control unit 50 calculates the unit vector and light brightness value of each cell of the remaining point light sources through the same procedure, and stores the calculated unit vector and light brightness value in the second storage unit 42.

On the other hand, if it is determined that the data processing of all the frame images has been completed at operation S80, the control unit 50 extracts three-dimensional features on the basis of the data stored in the second storage unit 42 at operation S90 so as to restore a three-dimensional image.

In order to extract the three-dimensional features, the control unit 50 calculates the sum of vectors of light brightness values according to data of cells of the same position with respect to all frames images, and sets a reference cell. Then, the control unit 50 stores a unit vector and a brightness value of a cell set as the reference cell in the second storage unit 42, and sets the stored data as the reference data of corresponding cells. Additionally, the control unit 50 repeats the above operations to calculate each reference data for all of cells (i, j) and stores each reference data in the second storage unit 42. Further, the control unit 50 calculates the vector field $\vec{N}^{i,j}$ by the above Equation {2}. Further, the control unit 50 calculates the solder shape from the calculated vector field $\vec{N}^{i,j}$ by the Equation {3} or {4} which represents a soldered surface height decision function.

Figure 6D:
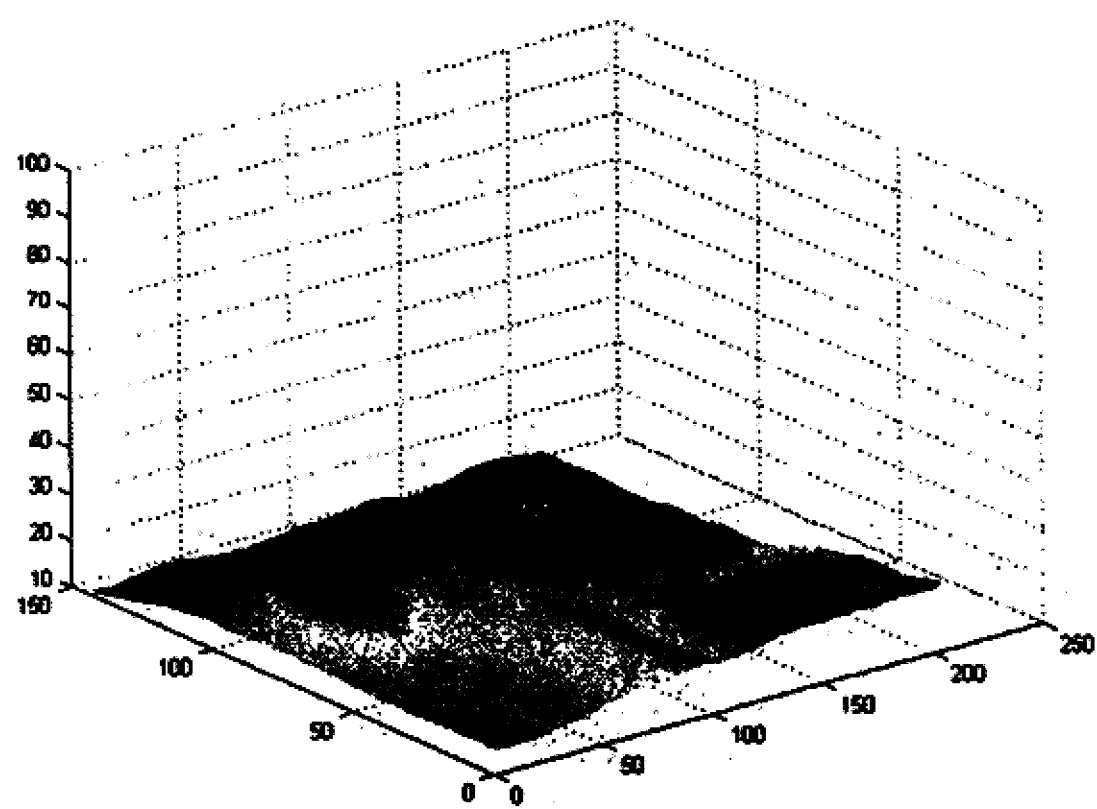
FIGS. 6D and 7D illustrate restored images from the operational examples of FIGS. 6A to 6C and FIGS. 7A to 7C.
Figure 7D:
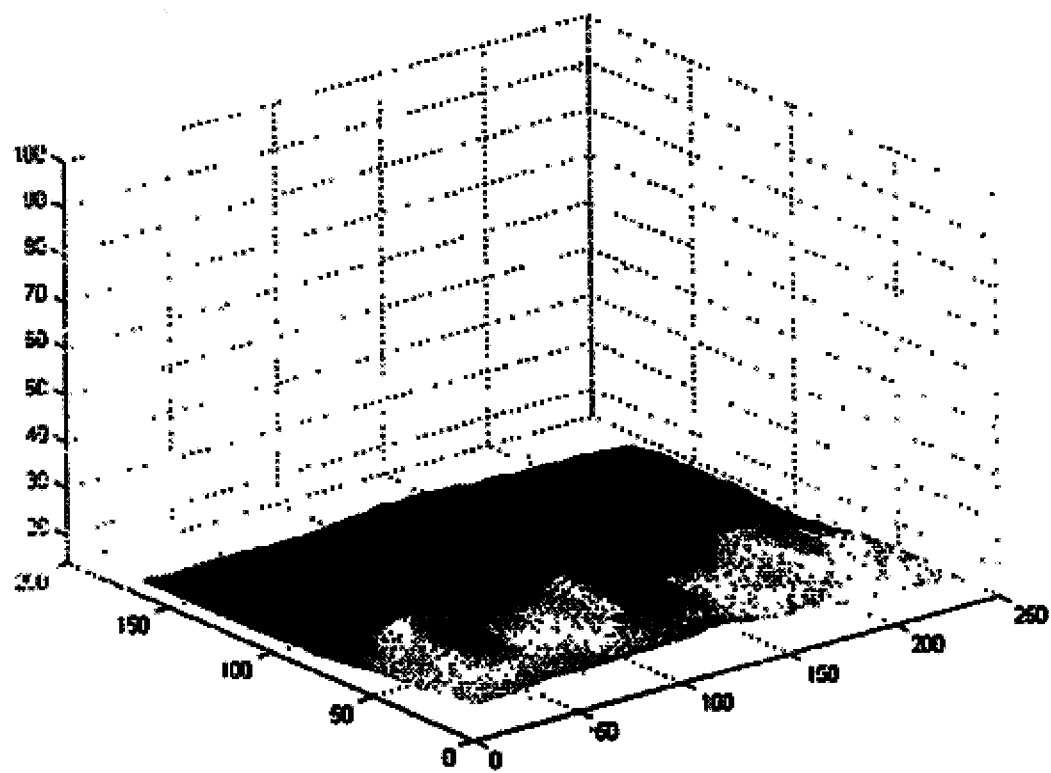
Figure 6A:
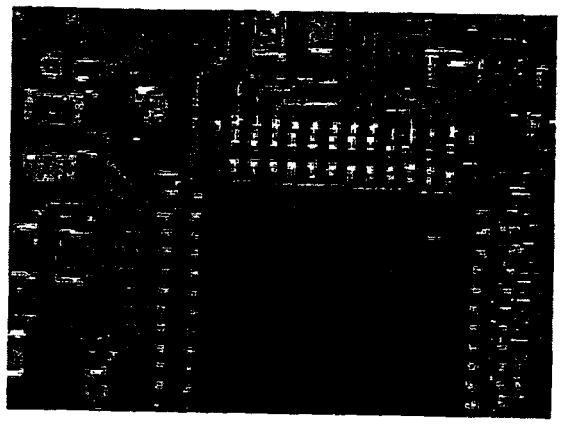
Figure 6B:
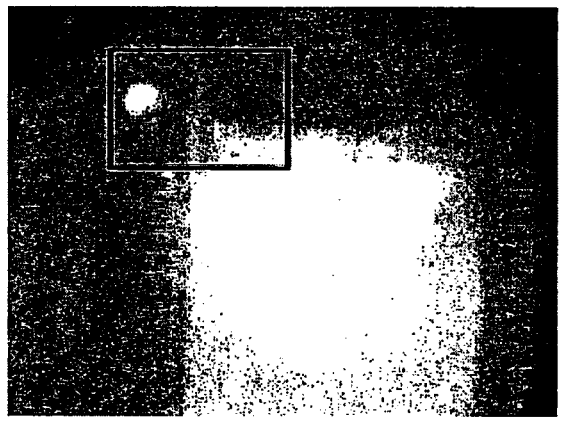
Figure 6C:
Figure 6D:
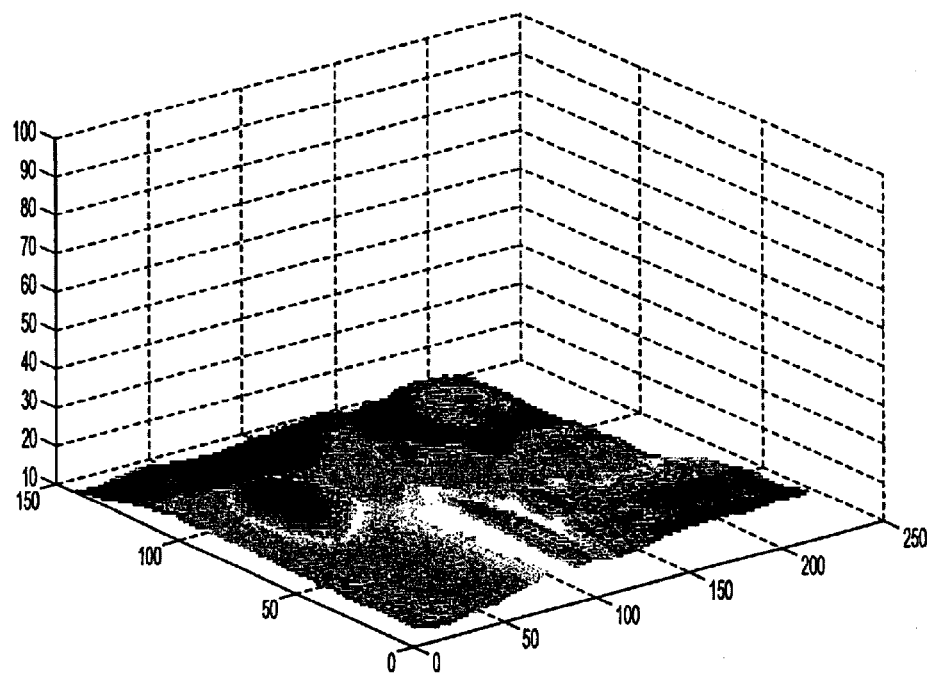
Figure 7A:
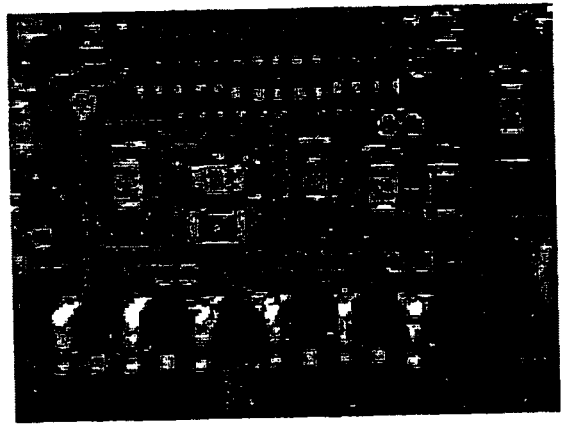
Figure 7B:
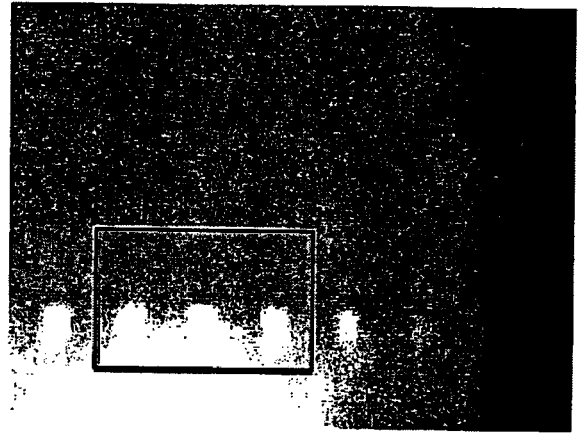
Figure 7C:
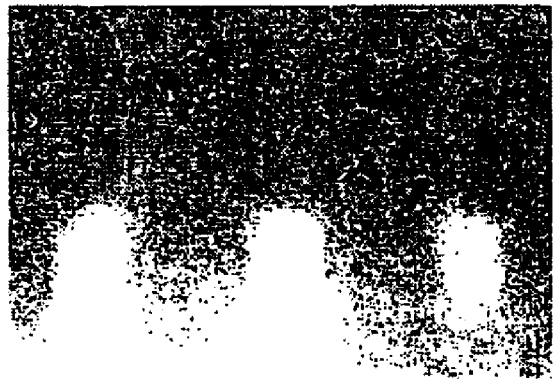
Figure 7D:
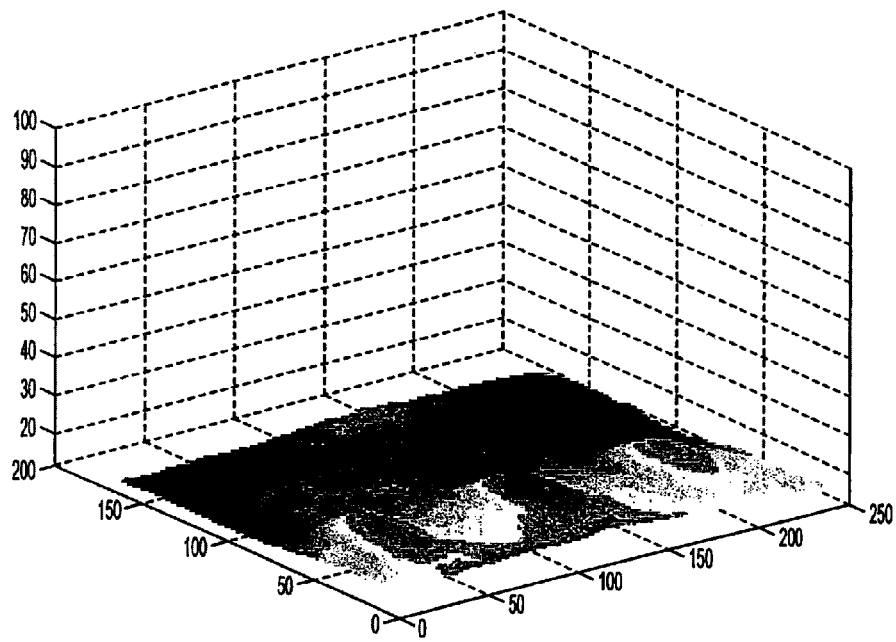
Figure 6A:
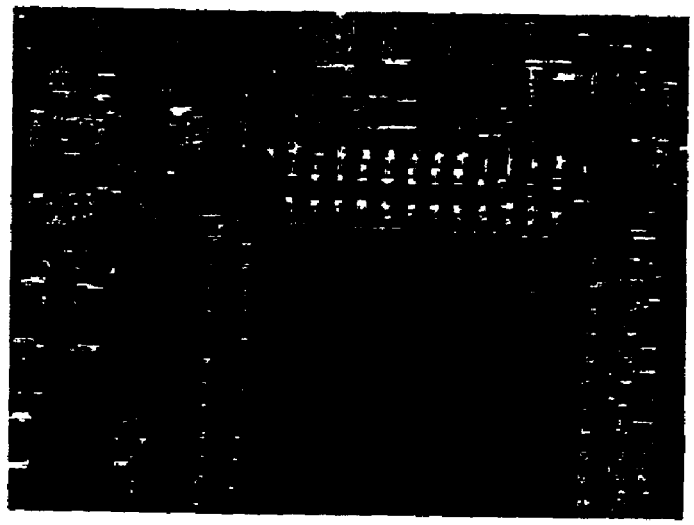
Figure 6B:
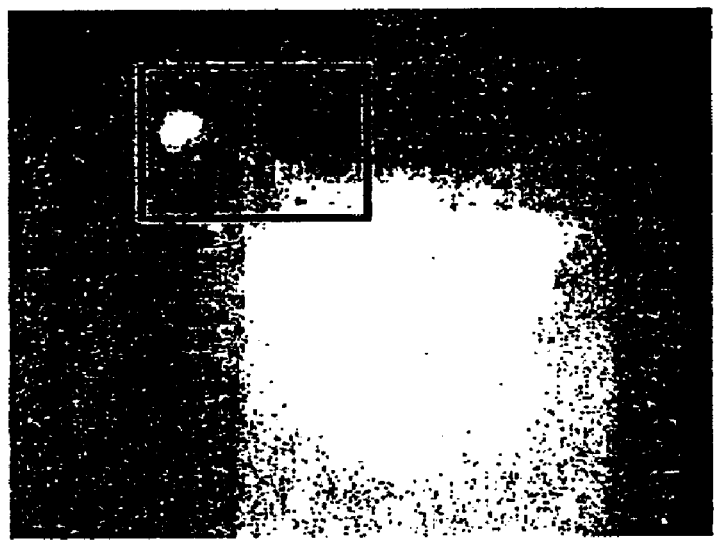
Figure 6C:
Figure 6D:
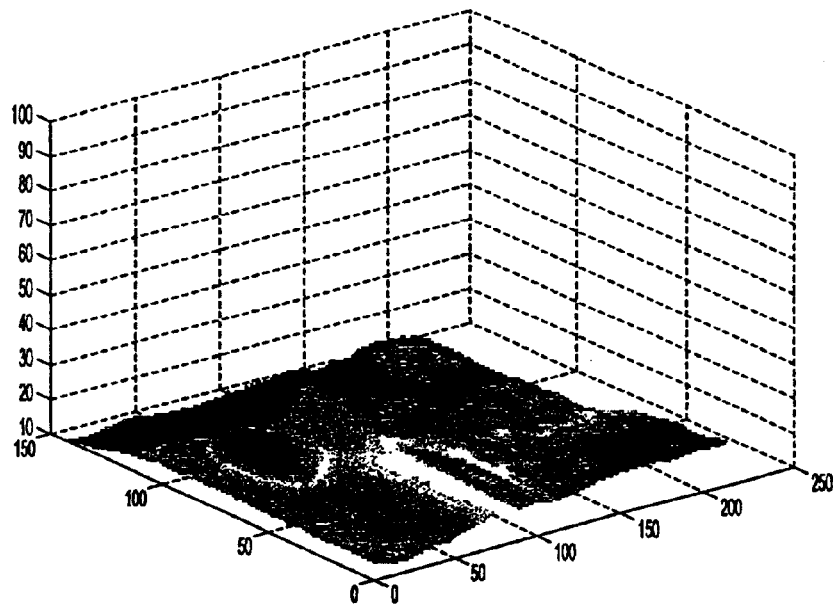
Figure 7A:
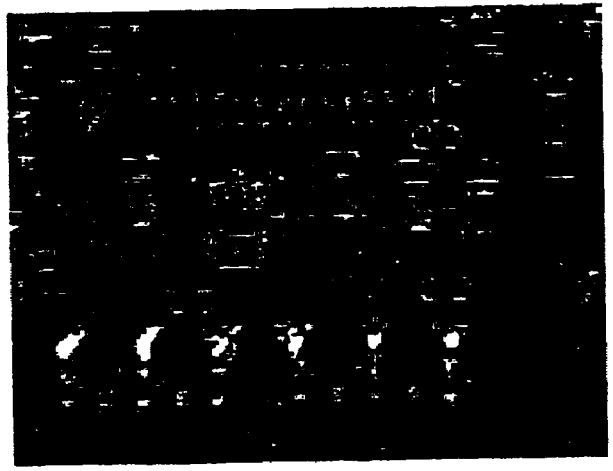
Figure 7B:
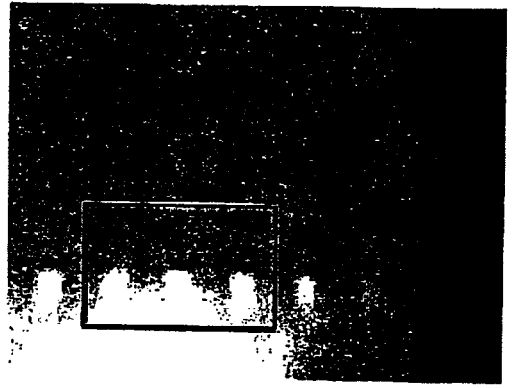
Figure 7C:
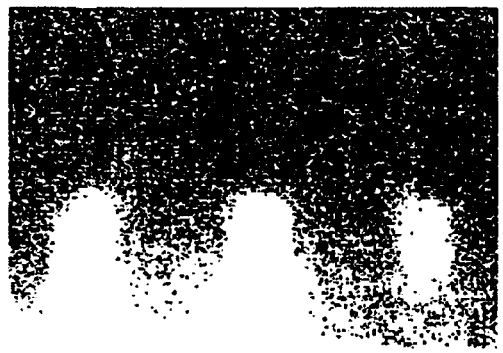
Figure 7D:
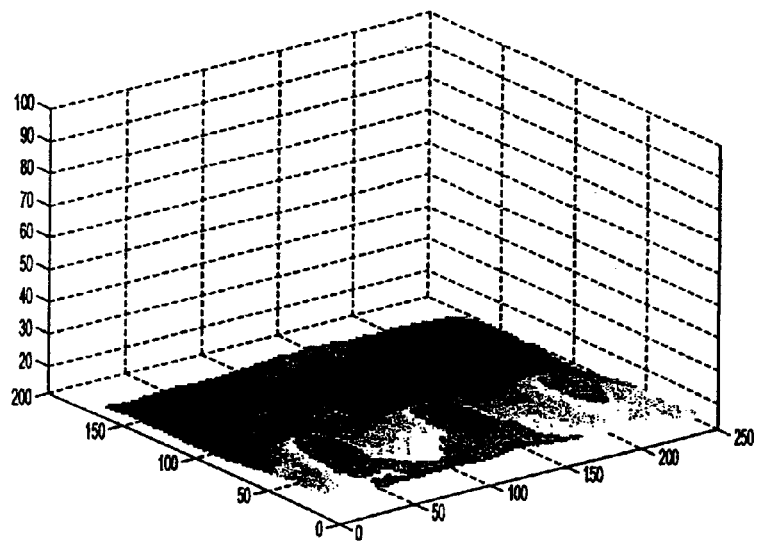

After the three-dimensional features are extracted, the control unit 50 restores a three-dimensional image of the subject 100 according to the extracted features at operation S100. Then, the control unit 50 controls the display driving unit 80 to display the restored three-dimensional image on the display unit 90. The restored image is illustrated in FIGS. 6D and 7D. Therefore, an inspector can inspect a soldered state while viewing the three-dimensional image displayed on the display unit 90.

As described above, the present invention provides a three-dimensional soldering inspection apparatus and method, which can obtain a plurality of images by point light sources having different irradiation angles and irradiation positions, and extracts three-dimensional features from the images to restore a three-dimensional image, thus simply confirming the soldered states visually, improving the reliability of inspection results and increasing the probability of detecting defective soldered states.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A three-dimensional soldering inspection apparatus, comprising:
   a lighting module provided with a plurality of light emitting devices;
   a photographing unit installed at a portion of the lighting module to photograph a subject placed inside said lighting module and illuminated by the light emitting devices;
   an image processing unit to capture each frame image from the illuminated subject photographed by said photographing unit;
   a storage unit to store data of each frame image;
   a control unit to extract three-dimensional features according to brightness values from each frame image and restore the extracted features as a three-dimensional image; and
   a display unit to display the three-dimensional image as a visual representation of brightness of the extracted three-dimensional features under said control of the control unit.

2. The soldering inspection apparatus according to claim 1, wherein said lighting module has said light emitting devices uniformly arranged in stages in an inner surface of a hemisphere-shaped casing to cover a subject such that said light emitting devices have different irradiation angles and positions with respect to the subject, and the lighting module has a photographing hole with a predetermined size formed at the top side of the lighting module such that said photographing unit photographs the subject.

3. The soldering inspection apparatus according to claim 2, wherein said photographing unit is installed at said photographing hole so as to photograph the subject, and is a charge coupled device (CCD) camera.

4. The soldering inspection apparatus according to claim 1, wherein said image processing unit captures each frame image from the image photographed by said photographing unit, divides the frame image into a plurality of cells, calculates a light brightness value of each cell, and transmits the calculated brightness value to said control unit.

5. The soldering inspection apparatus according to claim 4, wherein the control unit stores data of the frame image outputted from said image processing unit in said storage unit, and extracts unit vectors of the soldered surface and a shape of the soldered surface for the subject from the stored data, thereby restoring the extracted results as the three-dimensional image.

6. A method of controlling a three-dimensional soldering inspection apparatus, the method comprising:

obtaining frame images by light emitting devices directing light toward a subject and photographing light emitted from said light emitting devices and reflected off of the subject;

dividing and computing each obtained frame image;

extracting three-dimensional features from each divided and computed frame image; and restoring the extracted three-dimensional features as a three-dimensional image.

7. The controlling method according to claim 6, wherein the obtaining each frame image includes sequentially turning on the light emitting devices as point light sources, and photographing a frame image for each point light source.

8. The method according to claim 6, wherein the dividing and computing the obtained frame image includes:

dividing each frame image into a plurality of cells; and calculating a unit vector of each cell and a light brightness value of each cell by a predefined Equation.

9. The method according to claim 8, wherein said predefined Equation is expressed as the following Equation:

$$\vec{n}_{i,j}^k = \frac{\vec{v}_{i,j}^{LED\_k} + \vec{v}_{i,j}^{CAM}}{\left\|\vec{v}_{LED}^k + \vec{v}_{i,j}^{CAM}\right\|} W_{ij}^k, \quad W_{ij}^k = f(I_{i,j}^k)$$

where $\vec{n}_{i,j}^k$ is a normal vector to a cell calculated by analyzing the k-th image, $\vec{v}_{i,j}^{LED\_k}$ is a position vector from the cell on a soldered surface of a subject to be analyzed to a k-th one of the light emitting devices, $\vec{v}_{i,j}^{CAM}$ is a position vector from a projected cell on the soldered surface to the photographing unit, and $W^k_{i,j}$ is a light brightness value of a k-th image on a plane of Z=0.

10. The method according to claim 6, wherein the extracting three-dimensional features includes:

comparing cell data at the same position with respect to all image frames and setting a corresponding cell of the brightest image frame as a reference cell;

storing data of a unit vector and a light brightness value of the reference cell and setting the stored data as reference data of corresponding cells;

calculating a vector field according to the unit vector and the light brightness value; and calculating a solder shape by a soldered surface height decision function predefined from the vector field.

11. The method according to claim 6, wherein the vector field is calculated by the following Equation:

$$\vec{N}^{i,j} = \frac{\sum_{k=0}^{K} \vec{n}_k^{i,j}}{\left\|\sum_{k=0}^{K} \vec{n}_k^{i,j}\right\|}$$

where $\vec{N}^{i,j}$ is a vector field.

12. The method according to claim 6, wherein the height decision function is expressed as the following Equation:

$$Z_{i,j}^{SOL} = Z_{i-1,j}^{SOL} + (\vec{N}_{i,j})_x$$

$$Z_{i,j}^{SOL} = Z_{i,j-1}^{SOL} + (\vec{N}_{i,j})_y.$$

13. The soldering inspection apparatus according to claim 2, wherein said light emitting devices are grouped in at least one unit to be driven in the form of point light sources under the control of a light module driving unit controlled by said control unit.

14. The soldering inspection apparatus according to claim 13, wherein said light devices are variably controlled with respect to a degree of illuminance.

15. The soldering inspection apparatus according to claim 1, wherein said lighting module has said light emitting devices uniformly arranged in stages in the inner surface of a dome-shaped casing to cover the subject such that said light emitting devices have different irradiation angles and positions with respect to the subject, and the lighting module has a photographing hole with a predetermined size formed at the top side of the lighting module such that said photographing unit can photograph the subject.

16. The method according to claim 10, further comprising:

checking whether all light sources have been turned on after said storing data of a unit vector and a light brightness value of the reference cell and said setting the stored data as reference data of corresponding cells, and if determined that all light sources have not been turned on, then returning to said obtaining each image by turning on the light emitting devices.

17. The soldering inspection apparatus according to claim 1, wherein said plurality of light emitting devices are uniformly arranged in the form of rings in the lighting module.

18. A method of performing three-dimensional soldering inspection, the method comprising:

obtaining a plurality of images based upon emitted lights having different irradiation angles and irradiation positions directed at a subject;

extracting three-dimensional features according to brightness values from the obtained plurality of images to restore a three-dimensional image; and displaying the restored three-dimensional image as a visual representation of brightness of the extracted three-dimensional features to an inspector.

* * * * *

UNITED STATES PATENT AND TRADEMARK OFFICE
CERTIFICATE OF CORRECTION

PATENT NO. : 6,758,384 B2
DATED : June 6, 2004
INVENTOR(S) : Chang-Hyo Kim et al.

It is certified that error appears in the above-identified patent and that said Letters Patent is hereby corrected as shown below:

<u>Drawings,</u>
Replace FIGS. 6A-6D and 7A-7D with the attached.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,758,384 B2
APPLICATION NO. : 10/137388
DATED : July 6, 2004
INVENTOR(S) : Chang-Hyo Kim et al.

It is certified that error appears in the above-identified patent and that said Letters Patent is hereby corrected as shown below:

<u>Drawings,</u>
Replace FIGS. 6A-6D and 7A-7D with the attached.

This certifcate supersedes Certificate of Correction issued June 13, 2006.

Signed and Sealed this

Nineteenth Day of September, 2006

JON W. DUDAS
*Director of the United States Patent and Trademark Office*